(12) United States Patent
Jo et al.

(10) Patent No.: US 9,326,159 B2
(45) Date of Patent: Apr. 26, 2016

(54) REPRESENTATIVE DEVICE SELECTION METHOD IN COEXISTENCE SCHEME

(75) Inventors: Junho Jo, Gyeonggi-do (KR); Bonghoe Kim, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 13/696,130

(22) PCT Filed: Jul. 11, 2011

(86) PCT No.: PCT/KR2011/005057
§ 371 (c)(1),
(2), (4) Date: Nov. 5, 2012

(87) PCT Pub. No.: WO2012/005557
PCT Pub. Date: Jan. 12, 2012

(65) Prior Publication Data
US 2013/0054723 A1    Feb. 28, 2013

Related U.S. Application Data

(60) Provisional application No. 61/505,106, filed on Jul. 6, 2011, provisional application No. 61/408,640, filed on Oct. 31, 2010, provisional application No. 61/380,196, filed on Sep. 3, 2010, provisional application No. 61/362,696, filed on Jul. 9, 2010.

(51) Int. Cl.
*G06F 15/16*    (2006.01)
*H04W 24/00*    (2009.01)
(Continued)

(52) U.S. Cl.
CPC .......... *H04W 24/00* (2013.01); *H04W 72/1215* (2013.01); *H04W 84/20* (2013.01)

(58) Field of Classification Search
CPC ..... G06F 17/30; G06F 21/00; G06F 21/6245; G06F 2221/2111; G06F 11/2071; H04W 16/14; H04W 24/00; H04W 48/18; H04W 72/1215; H04W 84/20; H04W 84/18; H04W 72/04; H04W 88/00; H04W 88/085; H04W 72/00; H04W 92/02; H04W 36/0005; H04W 48/20; H04W 84/12; H04W 92/22; H04W 72/0406; H04L 47/12; H04L 12/2838; H04L 2012/2841; H04L 45/44; H04L 2209/80; H04L 45/00; H04L 45/26; H04L 29/12047; H04L 67/1002; G06Q 30/0267; H04N 21/43637; H04N 21/643

USPC ........................................................ 709/209
See application file for complete search history.

(56) References Cited

U.S. PATENT DOCUMENTS 7,254,615 B2 *  8/2007  Taib et al. ...................... 709/209
7,447,178 B2 * 11/2008  Kim ...................... H04W 84/20
                                                      370/331

(Continued)

FOREIGN PATENT DOCUMENTS

CN      1602606      3/2005
CN      1826589      8/2006

(Continued)

OTHER PUBLICATIONS

In the Patent Cooperation Treaty Application Serial No. PCT/KR2011/005057, Notification of Receipt of Record Copy dated Sep. 13, 2011, 21 pages.

(Continued)

*Primary Examiner* — Kevin Bates
*Assistant Examiner* — Ranjan Pant
(74) *Attorney, Agent, or Firm* — Lee, Hong, Degerman, Kang & Walmey; Jonathan Kang; Michael Monaco

(57) ABSTRACT

According to one embodiment of the present invention, provided is a method in which a server enabling heterogeneous wireless devices to coexist in an equal frequency band selects a master management device among multiple management devices for coexistence. The method for selecting a master management device may include: receiving from a server a request message from a certain management device among the multiple management devices; selecting a master-candidate device among the multiple management devices in response to reception of the request message; transmitting, to the selected candidate device, a request message for requesting the selected candidate device to take charge of a master management device; receiving a response message from the selected candidate device; selecting the selected candidate device as a master management device when the response message includes an acceptance response; and transmitting an announcement message including the result of the selection to the multiple management devices.

12 Claims, 15 Drawing Sheets

(51) Int. Cl.
*H04W 72/12* (2009.01)
*H04W 84/20* (2009.01)

(56) References Cited

U.S. PATENT DOCUMENTS

| | | | | |
|---|---|---|---|---|
| 2001/0012757 | A1* | 8/2001 | Boyle | H04W 84/20 455/11.1 |
| 2005/0237979 | A1 | 10/2005 | Kim et al. | |
| 2008/0137528 | A1* | 6/2008 | O'Toole et al. | 370/216 |
| 2008/0281938 | A1* | 11/2008 | Rai | G06F 15/177 709/209 |
| 2009/0280748 | A1* | 11/2009 | Shan | H04W 72/04 455/67.11 |
| 2010/0315997 | A1* | 12/2010 | Kim | H04N 21/43615 370/328 |
| 2011/0164556 | A1* | 7/2011 | Duan | H04W 24/04 370/328 |
| 2011/0246659 | A1* | 10/2011 | Bouazizi | H04N 21/2343 709/231 |
| 2011/0286401 | A1* | 11/2011 | Wijting et al. | 370/329 |
| 2011/0305206 | A1* | 12/2011 | Junell | H04W 16/14 370/329 |
| 2012/0057533 | A1* | 3/2012 | Junell et al. | 370/329 |
| 2012/0102161 | A1* | 4/2012 | Deprun | H04L 12/12 709/220 |
| 2012/0185553 | A1* | 7/2012 | Nelson | 709/209 |
| 2012/0195269 | A1* | 8/2012 | Kang et al. | 370/329 |
| 2012/0271902 | A1* | 10/2012 | Baliga et al. | 709/209 |
| 2013/0117402 | A1* | 5/2013 | Jo et al. | 709/208 |
| 2013/0310061 | A1* | 11/2013 | Sawai | 455/454 |

FOREIGN PATENT DOCUMENTS

| | | |
|---|---|---|
| CN | 101535977 | 9/2009 |
| KR | 1020020015688 | 2/2002 |
| KR | 1020050102702 | 10/2005 |

OTHER PUBLICATIONS

PCT International Application No. PCT/KR2011/005057, Written Opinion of the International Searching Authority Dated Feb. 28, 2012, 11 pages.
The State Intellectual Property Office of the People's Republic of China Application Serial No. 201180034082.6 Office Action dated Jan. 30, 2015, 7 pages.
The State Intellectual Property Office of the People's Republic of China Application Serial No. 201180034082.6, Office Action dated Sep. 6, 2015, 5 pages.

* cited by examiner (a)

(b)

REPRESENTATIVE DEVICE SELECTION METHOD IN COEXISTENCE SCHEME

CROSS-REFERENCE TO RELATED APPLICATIONS

This application is the National Stage filing under 35 U.S.C. 371 of International Application No. PCT/KR2011/005057, filed on Jul. 11, 2011, which claims the benefit of U.S. Provisional Application Ser. No. 61/362,696, filed on Jul. 9, 2010, U.S. Provisional Application Ser. No. 61/380,196, filed on Sep. 3, 2010, U.S. Provisional Application Ser. No. 61/408,640, filed on Oct. 31, 2010, and U.S. Provisional Application Ser. No. 61/505,106, filed on Jul. 6, 2011, the contents of which are all hereby incorporated by reference herein in their entirety.

TECHNICAL FIELD

The present invention relates to a coexistence scheme, and particularly, to a method and device for selecting and using a master device in a coexistence scheme.

BACKGROUND ART

In accordance with predictions of dramatic increases in wireless data traffic in line with the recent vitalization of eco-systems related to the wireless Internet such as smartphones and app stores, spectrum sharing methods have attracted attention as methods of increasing frequency supply. However, with the current spectrum management system, demand for increased frequency supply could not be met promptly and frequency supply may also be limited. That is, refarming of exiting frequencies and frequency allocation to new providers through auctions may lead to inefficient use of time. Fundamentally, it has become more difficult to ensure new frequency bands in the table of frequency allocations.

Recently, as a method of solving these problems, a spectrum sharing method has drawn attention. Apologists for spectrum sharing see that the current lack of frequencies results from existing compartment-type spectrum management and can be overcome by spectrum sharing technology though frequencies seem to lack in the table of frequency allocations. However, spectrum sharing technology is not a new concept but various schemes have been employed as one of the resource management methods in communications systems in technical aspects. For example, cellular schemes and multiple access schemes such as TDMA and CDMA that have been widely used are included herein.

As the existing spectrum sharing schemes are carried out according to the same technical standards or under the control of providers, effective interference suppression is possible. However, since distributed spectrum sharing schemes including a cognitive radio (CR) that has been recently introduced may cause tragedy of commons or harmful interference due to uncontrolled frequency use, problems arise in terms of spectrum management and existing user protection, and these schemes do not relate to the purpose of the market-based spectrum policy that becomes the current spectrum management system.

However, the apologists for spectrum sharing believe that the existing user protection from interference and the problems arising from the uncontrolled frequency use can be overcome or controlled through policy and technical means such as technical regulations or standards.

Types of spectrum sharing schemes may be classified according to sharing "methods" and sharing "subject and object." Here, specifically, sharing methods are interference avoidance schemes, and coexistence and cooperation models are considered. In terms of the sharing subject and object, types of spectrum sharing schemes can be divided into sharing among equals in which the subject and object have equal rights and primary-secondary sharing in which a primary user and a secondary user share spectrum.

First, with a model based on cooperation, separate protocols are present so that resource allocation and interference avoidance are possible through cooperation among all users. Resource allocation and interference avoidance may be carried out centrally by a base station or individually by respective users. Mobile communications systems based on CDMA or TDMA fall under the former, while ad-hoc systems fall under the latter.

On the other hand, with a model based on coexistence, each user carries out interference avoidance without resource allocation using common protocols. The currently commercialized technologies based on coexistence (or existence) may include wireless LAN and cordless phones, and overlay and underlay techniques can also be included herein. Between the above-described two models, the coexistence model passively involves resource allocation and interference control as compared to the cooperation model in terms of technology. Therefore, coexistence is likely to cause interference.

DISCLOSURE OF THE INVENTION

Therefore, an object of the present invention is to provide a method and device that performs communications while preventing interference from occurring in a coexistence scheme.

To achieve these and other advantages and in accordance with the purpose of the present invention, as embodied and broadly described herein, according to an aspect of the present invention, there is provided a method of selecting a master management device among a plurality of management devices for coexistence in a server that allows different types of wireless devices to coexist in the same bandwidth.

The method of selecting a master management device may include: receiving a request message from an arbitrary management device among the plurality of management devices to the server; selecting a candidate device for a master management device among the plurality of management devices in response to the request message; sending a request message to the candidate device to request the candidate device to be the master management device; receiving a response message from the candidate device; selecting the candidate device as the master management device when an acceptance response is included in the response message; and sending an announcement message including a selection result to the plurality of management devices.

The request message received from the arbitrary management device may be a registration request message or a master selection request message. The registration request message may be a Registration Request message or the master selection request message is a Master CM Request message. The registration request message may include an element indicating whether to register information about devices managed by the arbitrary management device to the server, update at least one piece of the information about the devices, or delete at least one piece of the information about the devices.

The method may further include: sending a request message to at least one another device among the plurality of management devices to request the at least one another device to be a slave device when the acceptance response is included in the response message; and receiving a response message from the at least one another device.

The request message to request the at least one another device to be the slave device may be a slave request message or a Slave CM Request message.

The announcement message may include at least one of information about the master management device selected and information about a slave management device.

The management device may be a coexistence manager (CM), and the server may be a coexistence discover and information server (CDIS).

According to another aspect of the present invention, there is provided a method of selecting a master management device among a plurality of management devices that allow different types of wireless devices to coexist within the same bandwidth, the method including: selecting a candidate for a master management device among the plurality of management devices by a first management device; sending a master request message to the candidate to request the candidate to be the master management device; sending a master selection result indication message to the server when receiving a master response message including an acceptance response from the candidate; and receiving an announcement message including information about the master management device and a slave management device from the server.

The method may further include determining the slave management device on the basis of the master response message when receiving the master response message including the acceptance response from the candidate.

According to another aspect of the present invention, there is provided a server allowing different types of wireless devices to coexist within the same bandwidth, the server including: a transmission/reception unit; and a processor.

The processor performs processes of: receiving a request message from an arbitrary management device among a plurality of management devices through the transmission/reception unit; selecting a candidate device for a master management device among the plurality of management devices in response to the request message; sending a request message to the candidate device to request the candidate device to be the master management device through the transmission/reception unit; receiving a response message from the candidate device through the transmission/reception unit; selecting the candidate device as the master management device when an acceptance response is included in the response message; and sending an announcement message including a selection result to the plurality of management devices through the transmission/reception unit.

ADVANTAGEOUS EFFECTS

According to a method of selecting a master device between devices being used in one or more networks that can coexist without cooperation according to an exemplary embodiment according to the present disclosure and controlling other networks and devices by the master device, the devices being used can perform communications while reducing interference that may occur therebetween.

MODES FOR CARRYING OUT THE PREFERRED EMBODIMENTS

Figure 1:
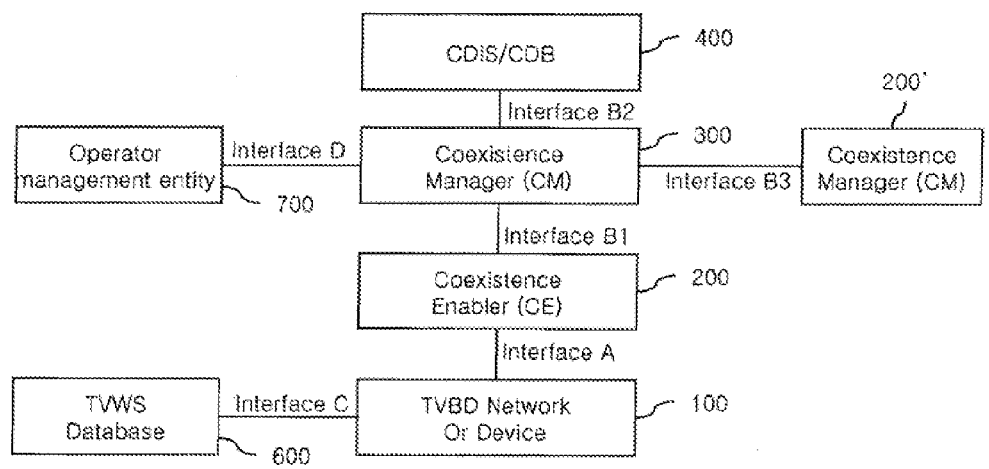
FIG. 1 is a block diagram illustrating a coexistence system according to an exemplary embodiment according to the present disclosure.

Since the present invention can be applied with various changes thereto and have various types of embodiments, specific embodiments intend to be exemplified in the drawings and minutely described in the detailed description. The invention should not be construed as being limited to the embodiments set forth herein. All such modification, equivalents, and/or substitutions, from the explicit description hereinabove, are intended to be considered as included within such spirit and/or scope of the present invention.

Also, though terms like a first and a second are used to describe various components of the present invention, the components are not limited to these terms. These terms are used only to differentiate one component from another one. For example, a component referred to as a first component in an embodiment can be referred to as a second component in another embodiment. In a similar manner, a second component can be referred to as a first component. As used herein, the term and/or includes any and all combinations of one or more of the associated listed items.

It will be understood that when an element is referred to as being "connected to" or "coupled to" another element, it can be connected or coupled to the other element or intervening elements may be present. In contrast, when an element is referred to as being "directly connected to" or "directly coupled to" another element, there are no intervening elements present.

In the following description, the technical terms are used only for explaining a specific exemplary embodiment while not limiting the present invention. The terms of a singular form may include plural forms unless referred to the contrary. The meaning of "include" or "has" specifies a property, a number, a step, a process, an operation, an element, a component, or a combination thereof but does not exclude other properties, numbers, steps, processes, operations, elements, components or combinations thereof or additions.

In addition, when terms used in this specification are not specifically defined, all the terms used in this specification including technical and scientific terms can be understood by those skilled in the art. Further, when general terms defined in the dictionaries are not specifically defined, the terms will have the normal meaning in the art. As long as clearly not defined in this application, terms will not be construed as ideally or excessively formal meanings.

Reference will now be made in detail to the preferred embodiments of the present invention, examples of which are illustrated in the accompanying drawings. The same reference numerals will be used throughout to designate the same or like components, and descriptions thereof will be omitted.

FIG. 1 is a block diagram illustrating a coexistence system according to an exemplary embodiment according to the present disclosure. As shown in FIG. 1, a coexistence system, that is, the 802.19 system architecture has three logical entities and six logical interfaces.

The three logical entities are defined as a coexistence manager (CM) 20, a coexistence enabler (CE) 30, and a coexistence database (CD) or a coexistence discovery and information server (CDIS) 10 by their functional roles. The six logical interfaces are defined as an interface A, an interface B1, an interface B2, an interface B3, an interface C, and an interface D by interfaces with other 802.19.1 logical entities.

Additionally, the 802.19 system interacts with external elements including a TV Whites Space (TVWS) database 200, a television band device (TVBD) network or device 100, and an operator management entity (OME) 300.

Here, TV white space refers to spectrum that is unused by broadcasters from VHF and UHF bandwidths for TV broadcasting. TV white space refers to unlicensed spectrum that can be used by anyone who satisfies the requirements of the government's radio regulations. Specifically, TV white space spatially means spectrum set aside due to concerns over frequency interference between broadcasters and spectrum that is unused locally or an area that broadcast waves cannot reach, and temporally means broadcast spectrum that is unused at the dawn when broadcasters do not transmit broadcast.

TV white space devices should not disrupt reception by interfering with TV viewers, who are clients of broadcasters, and affect wireless microphone devices that use part of this spectrum and perform communications at low power. To meet these requirements, TV white space devices need the following techniques.

TV white space devices may require spectrum sensing techniques of identifying TV channels in use to protect broadcast channels, a database including location-based TV channel information and access protocol techniques, coexistence techniques between different types of devices using TVWS band, intelligent autonomous wireless access element techniques for variable wireless channels, and subscriber authentication for wireless channel protection, and security techniques for user protection. In the present invention, among these techniques, coexistence techniques between the same or different types of devices (or equipment) will be described in detail.

The CE 30 may request and acquire information required for coexistence from the TVBD (TeleVision Band Device) network or device 100, translate reconfiguration requests/commands and control information received from the CM 20 into TVBD-specific reconfiguration requests/commands, and send them to the TVBD network or device 100. Here, a TVBD refers to a terminal that allows the use of TV white space according to the Federal Communication Commission (FCC).

The CM 20 has functions such as searching other CMs in order to solve coexistence problems between TVBD networks, coexistence decision making including generating and providing coexistence requests/commands and control information corresponding to the CE 30, and supporting exchange of information required for coexistence between CMs (which may include hierarchical or peer-to-peer decision making when it comes to arranging the CMs).

In addition, the CM 20 may also have functions such as sharing information between a plurality of CMs to select a master CM, generating coexistence white space map in order to efficiently share frequency resources between other networks and systems each of which has a distributed topology, and adjusting networks when performing management related to TVWS coexistence.

The CM 20 may be embedded in a device such as an access point (AP) or mounted outside the device. A fixed device like an AP (Access Point) may have the functions of the CM 20, and select and manage a master CM that represents a group of specific systems, providers or spatially separated devices.

At this time, the master CM may be designated by the CD (or CDIS) 10 to achieve spatial reuse between spatially separated users. Interference map between CMs necessary for resource allocation may be acquired by geo-location or by additionally using and processing neighbor information received from CMs. In the case of the same type of networks, a master CM may be selected through communications therebetween. In the case of different types of networks, a master CM may be negotiated via the CD (or CDIS) 10.

The CM 20 may have a hierarchical CM architecture according to coverage or specific classification criteria. With reference to white space map acquired from the CD (or CDIS) 10, a CM of the uppermost layer selects resources in consideration of its lower layer, and a lower-layer CM selects the rest of resources in consideration of its lower layer, which may be repeated.

In the case of small networks with small coverage/power, a primary user is relatively unlikely to be detected, and thus, more available TVWS channels are present. Therefore, a small network compares its own WM (White space Map) with WM (White space Map) of a different type of neighbor network through the CM 20, and selects and uses channels first that the neighbor network cannot use. This may be controlled by the CDIS 11, the CDB 12 or the CD 10, or carried out in reverse order from a small network.

The CD (Coexistence Database) 10 may be shown as a CDIS or a CDB according to functions. The CD (or CDIS) 10 may have functions such as generating coexistence white space map having a centralized topology to efficiently share frequency resources between other networks and systems, controlling a plurality of operators when performing management related to TVWS coexistence, and selecting a master CM to reduce communication overhead between CMs and solve coexistence problems.

In addition, the CD 10 may perform functions such as calculating coexistence contour to discover neighboring networks/systems, redirecting resources (C-MAP) according to the TVBD in order to solve coexistence problems, promoting the opening of the interfaces between CMs to support discovery of the CMs, and collecting, aggregating, and providing information to promote coexistence.

The CD 10 may omnipotently distribute resources in terms of resource allocation, present priority rules between CMs and control resource selection of the CMs as an intermediary, or serve as an information sharing medium between the CMs and external or different types of networks as a CM DB (DataBase).

As shown in FIG. 1, the interfaces may be divided into three groups: the interface B1, the interface B2, and the interface B3, which are interfaces between 802.19.1 entities; the interface A, which is an interface between the 802.19.1 entity and the TVBD network/device; and the interface C and the interface D, which are interfaces between the 802.19.1 entity and the TVWS database or the OME. Other interfaces in each group are divided according to their using methods, types of information being exchanged, and underlying protocols.

The interface A is an interface between the CE 30 and the TVBD network or device 100. The TVBD network or device 100 may provide information required for coexistence, configuration/information requests for coexistence, configuration/measurement/information responses for coexistence, and other information as needed. Configuration requests/commands and control information (corresponding to the coexistence requests/commands and the control information received from the CM), requests/commands related to control of measurements performed by the TVBD network or device 100, information indicating available resources, and other information as needed may be provided from the CE 30 to the TVBD network or device 100.

The interface B1 is an interface between the CE 30 and the CM 20. Information required for coexistence (information obtained from the TVBD network or device 100) and other information as needed may be provided from the CE 30 to the CM 20. Coexistence requests/commands and control information and other information as needed may be provided from the CM 20 to the CE 30.

The interface B2 is an interface between the CM 20 and the CD (or CDIS) 10. Information required for coexistence map, information required for neighbor set, information required for register/unenrolled, information required for discovery (obtained by the CM currently being used), information required for coexistence (obtained by the CM currently being used), and other information as needed may be provided from the CM 20 to the CD (or CDIS) 10.

Information notified for coexistence map, information notified for neighbor set, information notified for a master CM, information for discovery (obtained by other CMs), information required for coexistence (obtained by other CMs), and other information may be provided from the CD (or CDIS) 10 to the CM 20.

The interface B3 is an interface between the CM 20 and the CM 21. Information and messages for discovery and coexistence, information notified for register/unresgister (from a CM to the master CM or a CM of a device to a CM of a server), information notified for coexistence (from a CM to a master CM or from a CM of a device to a CM of a server) and other information may be provided from the CM 20 to the CM 21.

The interface C is an interface between the TVBD device 100 and the TVWS database 200. Information notified for available channels may be provided from the TVWS DB 200 to the TVBD device 100.

The interface D is an interface between the CM 20 and the OME (Operator Management Entity) 300. Network operation information related to information (for example, spectrum policy/limitations concerning operation of networks) and other information as needed may be provided from the OME 300 to the CM 20.

The coexistence system as shown in FIG. 1 may have various topologies: centralized, distributed, and autonomous topologies. In the present invention, coexistence systems that have centralized and distributed topologies will be described in detail.

Figure 2:
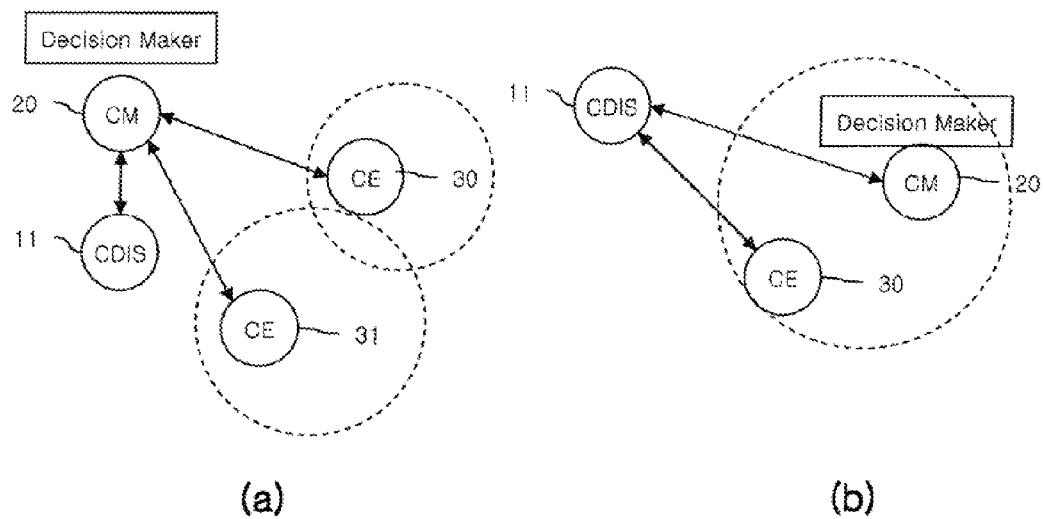
FIG. 2 is a conceptual view illustrating a method of selecting a master CM (coexistence manager) in a coexistence system having a centralized topology according to an exemplary embodiment according to the present disclosure.

FIG. 2 is a conceptual view illustrating a method of selecting a master CM (coexistence manager) in a coexistence system having a centralized topology according to an exemplary embodiment according to the present disclosure. As shown in FIG. 2, in the coexistence system that has the centralized topology, the CDIS 11 chiefly performs data storage and data processing, and the CM 20 serves as a decision maker. In particular, the CM (or master CM) 20 may control all the networks or other terminals. Here, in terms of the CM (or master CM) 20, one of the TVBDs (TV Band Devices) interfacing with networks may become the CM (or master CM) 20.

FIGS. 3A and 3B are conceptual views illustrating a method of selecting a master CM (coexistence manager) in a coexistence system having a distributed topology according to an exemplary embodiment according to the present disclosure. As shown in FIGS. 3A and 3B, in the coexistence system that has the distributed topology, the CDIS 11 or the CDB 12 promotes the opening of the interfaces between the CMs, and the CM 20 exchanges information required for coexistence. The CM 20 may carry out hierarchical or peer-to-peer decision making.

The coexistence system may determine a master CM by decision making through negotiation between the CMs through the interface (or interface B3) as shown in FIG. 3A or may make a decision or determine a master CM as the CM 20 requests the CDIS 11 or the CDB 12 to arbitrate through the interface (or interface B2) as shown in FIG. 3B.

Figure 4:
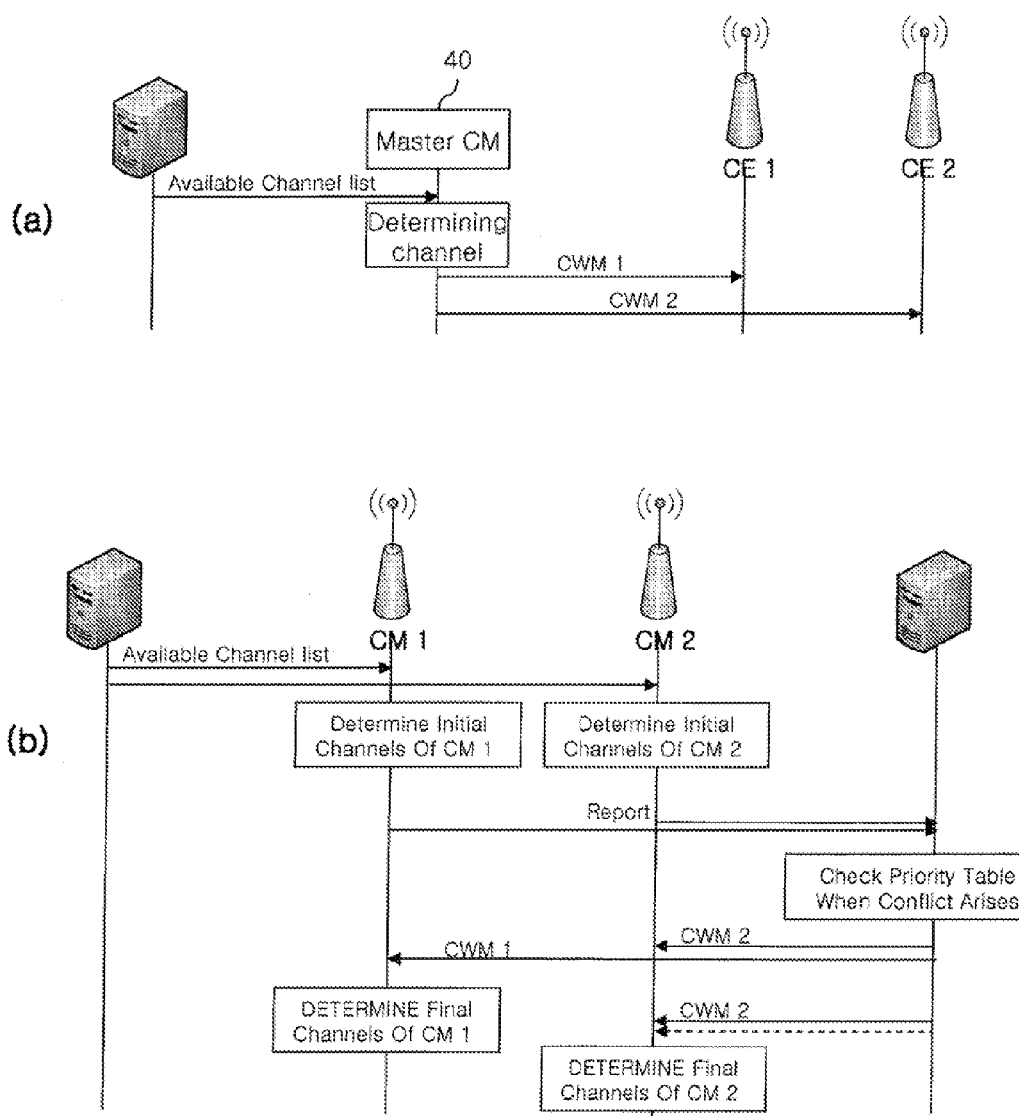
FIGS. 4A and 4B are conceptual views showing the differences in operation between the centralized topology and the distributed topology in the coexistence system according to the exemplary embodiment according to the present disclosure.

FIGS. 4(*a*) and 4(*b*) are conceptual views to show differences in operation between the centralized topology and the distributed topology in the coexistence system according to the exemplary embodiment according to the present disclosure. As shown in FIG. 4(*a*), in the coexistence system having the centralized topology, a representative (master or super) CM 40 may allocate individual channels to other CMs (or CEs). Here, CWM (Coexistence White space Map) may be used to show channels to be used.

As shown in FIG. 4(b), in the coexistence system that has the distributed topology, CMs (for example, CM 1 and CM 2) may be classified and given priority according to predetermined criteria or policy. The CM 20 may report/send priority information about available channels to the CDB (Coexistence Database)/CDIS or other CMs. Here, CWM (Coexistence White space Map) may be used as available channels for the CMs to select.

System requirements for decision making as shown in FIGS. 4(a) and 4(b) are as follows. The 802.19.1 system needs to be able to analyze acquired information, implement coexistence decisions, and support various topology models. Here, regardless of topology models, information may include bandwidth of each TVWS network or device, available channel list that is can be known from the TVWS network/device, power limitation with respect to each TVWS channel, regulations, system parameters, or pre-analyzed neighbor information.

Figure 3:
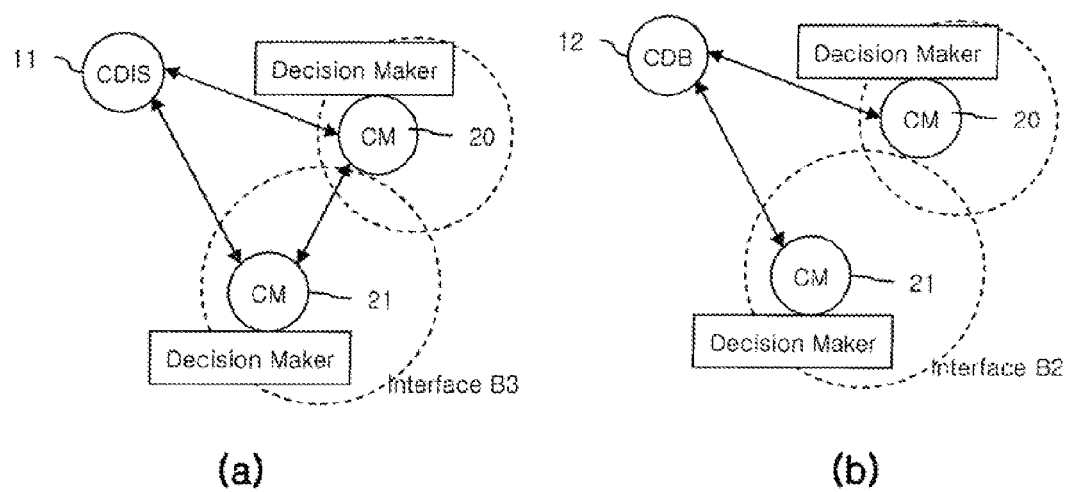
FIGS. 3A and 3B are conceptual views illustrating a method of selecting a master CM (coexistence manager) in a coexistence system having a distributed topology according to an exemplary embodiment according to the present disclosure.
Figure 5:
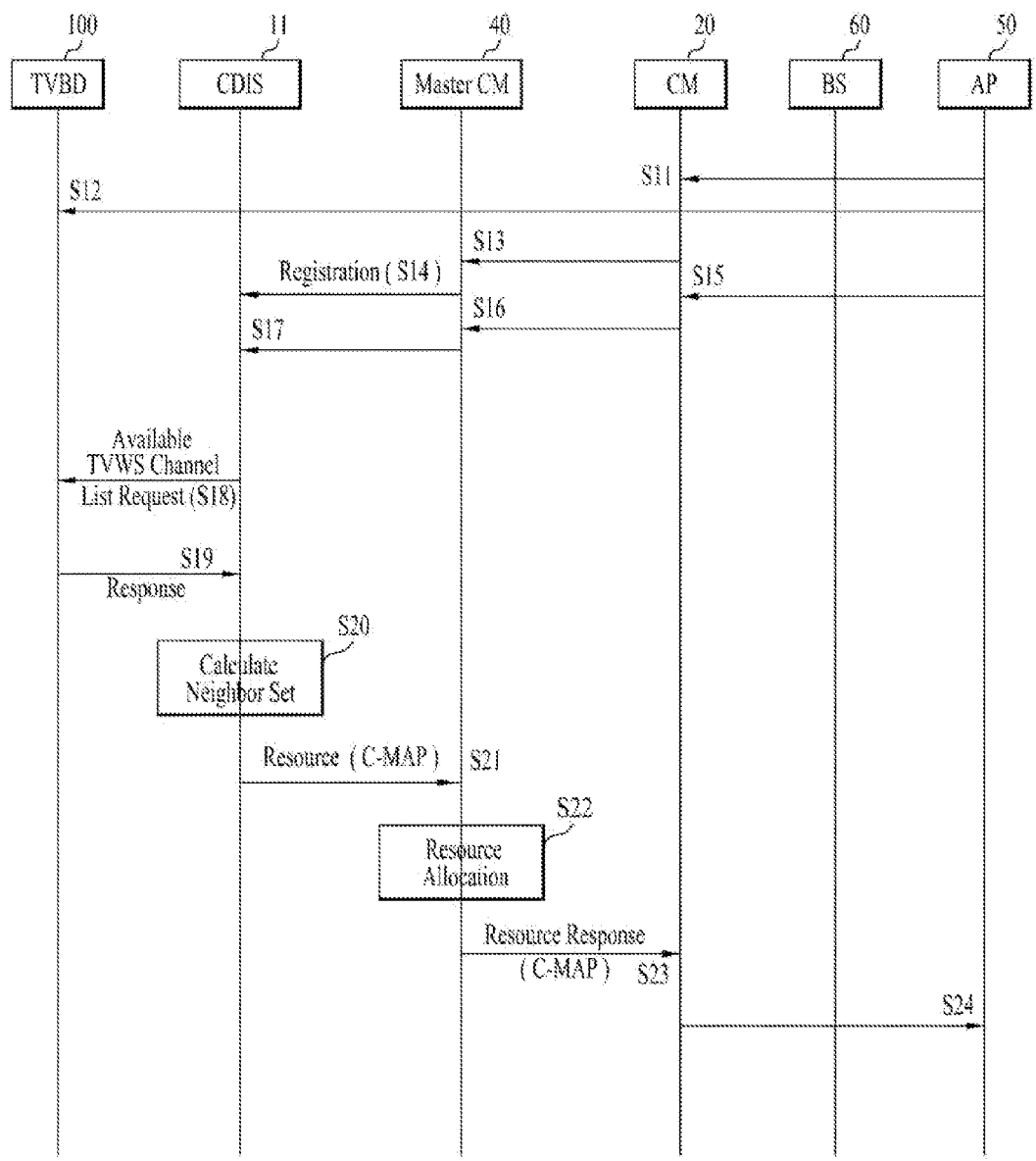
FIG. 5 is a signal flow diagram showing how resources are allocated by a master CM (coexistence manager) in the coexistence system having the centralized topology according to an exemplary embodiment according to the present disclosure.
Figure 6:
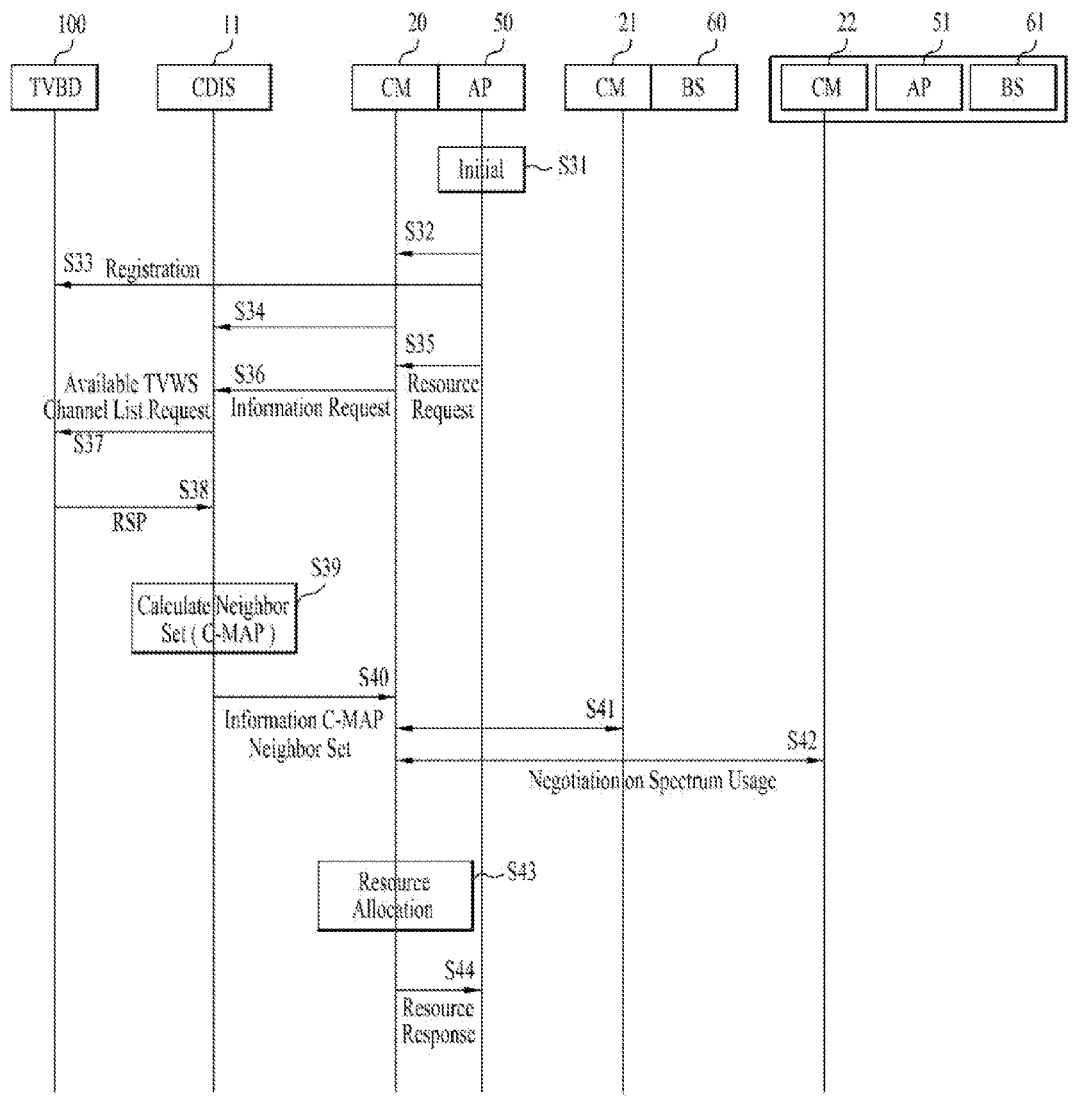
FIG. 6 is a signal flow diagram showing how resources are allocated by a master CM (coexistence manager) in the coexistence system having the distributed topology according to an exemplary embodiment according to the present disclosure.

FIGS. 5 and 6 are signal flow diagrams illustrating a method of allocating resources by a master CM (coexistence manager) or a master device in the coexistence systems having the centralized topology and the distributed topology as shown in FIGS. 2 to 4.

FIG. 5 is a signal flow diagram illustrating how a master CM (coexistence manager) allocates resources in the coexistence system having the centralized topology according to the exemplary embodiment according to the present disclosure.

As shown in FIG. 5, according to a method of allocating resources by the master CM 40 in a single centralized topology, an AP 50 requests resources in operations S15 to S17, the CDIS 11 acquires available channel list from the TVBD 100 and the master CM 40 of the available channel list in operation S18 to S21, and the master CM 40 allocates resources to the CM 20 in operations S22 to S23.

A process in which resources are allocated by the master CM in the centralized topology will now be described in detail with reference to FIG. 5.

When the AP 50 is registered to the TVBD 100 and the CM 20 in operations S11 to S12, the CM 20 is registered to the master CM 40 in operation S13, and the master CM 40 is registered to the CDIS 11 in operation S14. When the AP 50 requests resources through a resource request Resource (C-MAP) REQ from the CM 20 in operation S15, the CM 20 requests neighbor list and information about C-MAP from the master CM 40 in operation S16, and the master CM 40 requests the neighbor list and the information about the C-MAP from the CDIS 11 in operation S17.

The CDIS 11 requests available TVWS channel list request (REQ) from the TVBD in operation S18 and receives a response to the request in operation S19, and calculates neighbor or neighbor set and C-MAP of the CM 20 in operation S20. The CDIS 11 informs the master CM 40 of the results obtained in operation S20, that is, the neighbor list and/or C-MAP of the CM 20 in operation S21. The master CM 40 allocates resources (C-MAP) to the CM 20 in operations S22 to S23, and the CM 20 informs the AP 50 of the C-MAP in operation S24.

FIG. 6 is a signal flow diagram illustrating how a master CM (coexistence manager) allocates resources in the coexistence system having the distributed topology according to the exemplary embodiment according to the present disclosure.

As shown in FIG. 6, according to a method of allocating resources by the master CM 40 in a single distributed topology, the AP 50 requests resources in operations S 35 to S37, the CDIS 11 obtains available channel list from the TVBD 100 and indicates the CM 20 of the available channel list in operations S37 to S40, and the CM 20 negotiates with other CMs (for example, the CM 21 and a CM 22) for resources in operations S41 and S42.

A process in which resources are allocated by the master CM 40 in the distributed topology will now be described in detail with reference to FIG. 6.

When the AP 50 is registered to the TVBD 100 and the CM 20 in operations S31 to S33, the CM 20 is registered to the CDIS 11 in operation S34. When the AP 50 requests resources from the CM 20 through a resource request Resource request (REQ) in operation S35, the CM 20 requests neighbor list information and C-MAP from the CDIS 11 in operation S36.

The CDIS 11 requests available TVWS channel list request (REQ) from the TVBD 100 in operation S37 and receives a response to the request in operation S38, and calculates neighbor set and C-MAP of the CM 20 in operation S39. The CDIS 11 informs the CM 20 of the results obtained in operation S39, that is, the neighbor list and the C-MAP of CMs in operation S40, and the CM 20 negotiates with other CMs (for example, the CM 21 and the CM 22) for resources in operation S41 and S42 and reallocates resources (C-MAP) to the AP 50 in operation S43 and S44.

Figure 7:
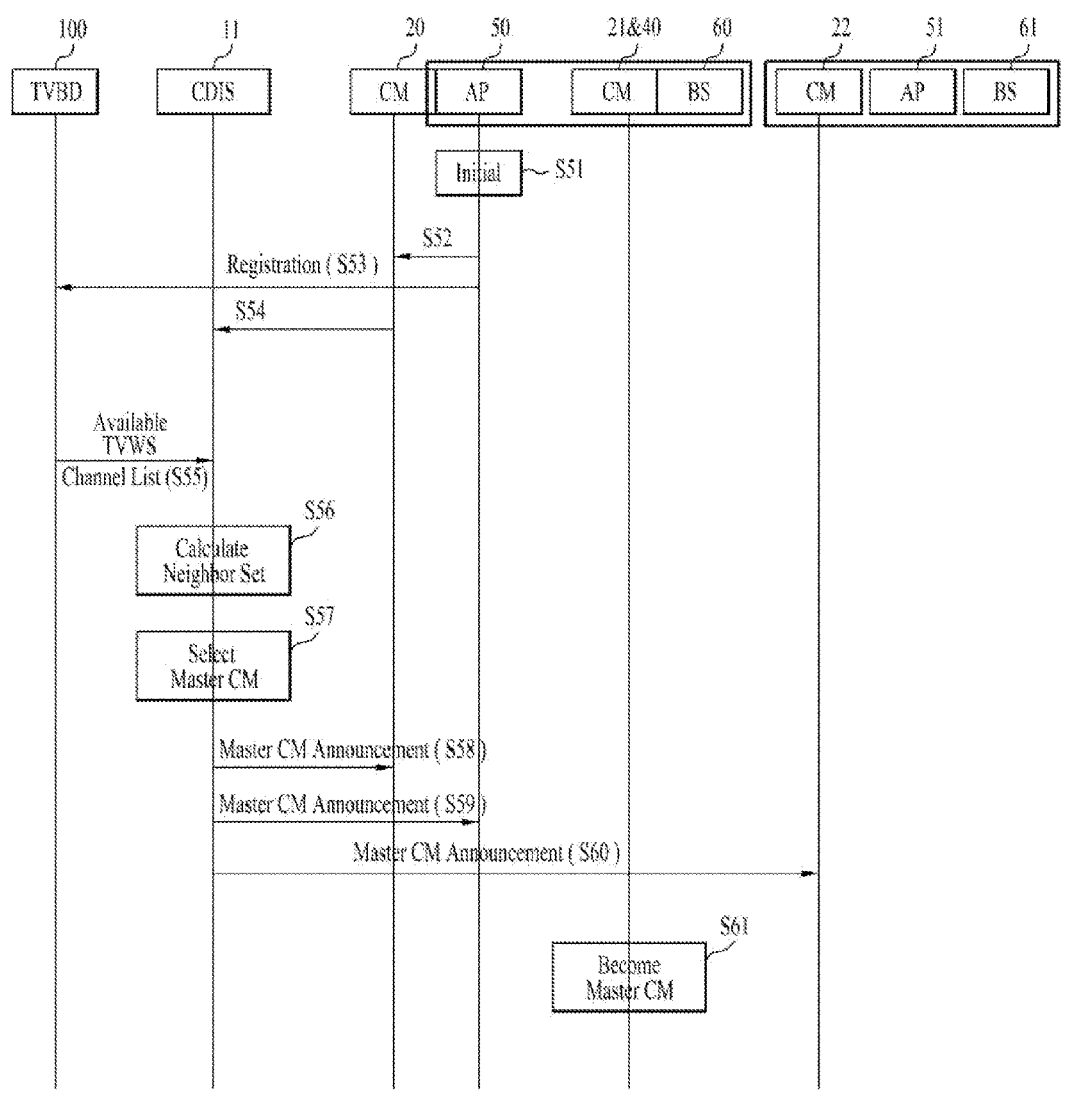
FIG. 7 is a signal flow diagram a method of selecting a master CM (coexistence manager) in a coexistence system having a centralized topology according to an exemplary embodiment according to the present disclosure.
Figure 8:
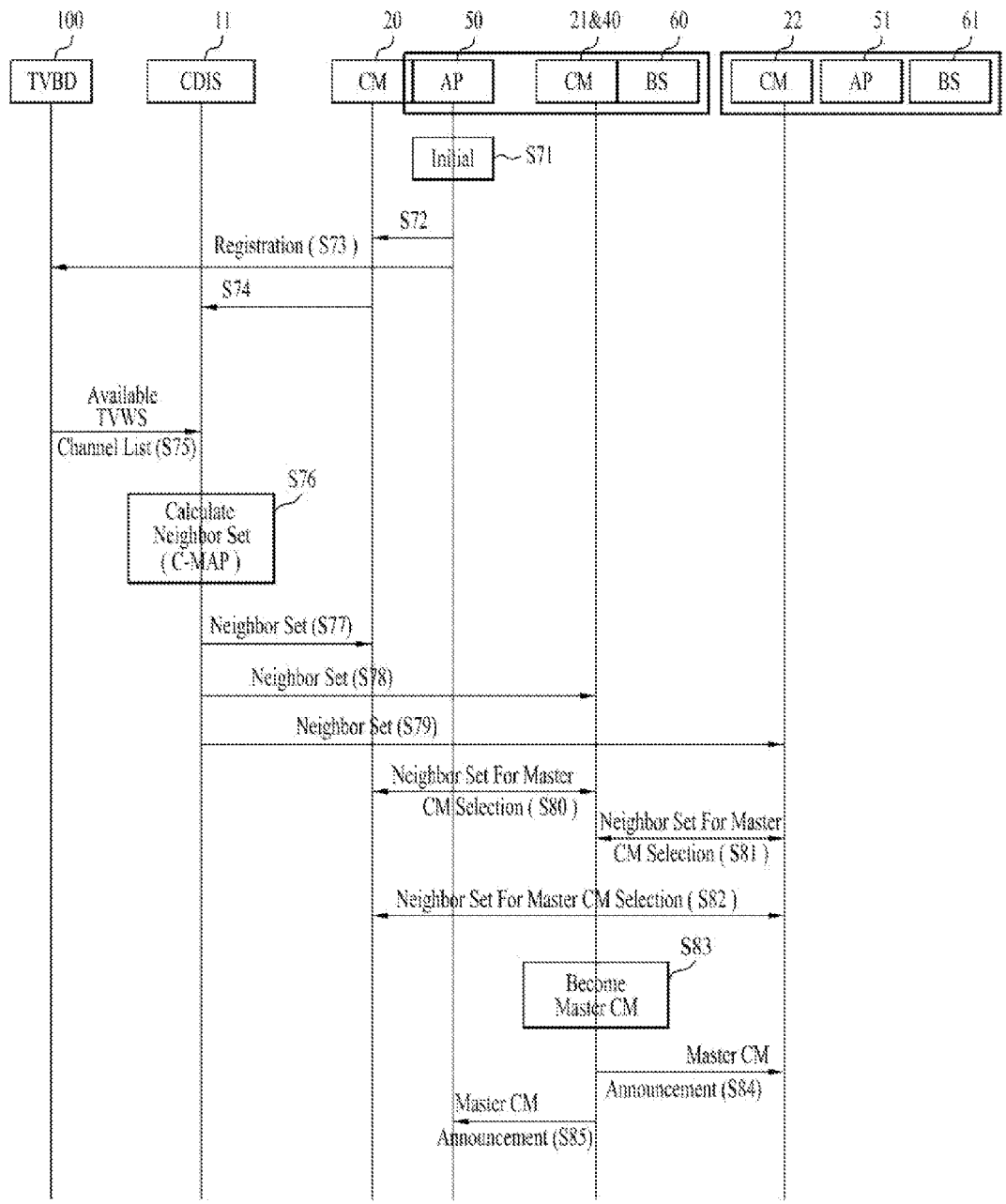
FIG. 8 is a signal flow diagram illustrating a method of selecting a master CM (coexistence manager) in a coexistence system having a distributed topology according to an exemplary embodiment according to the present disclosure.

FIGS. 7 and 8 are signal flow diagrams illustrating a method of selecting a master CM (or master device) in the coexistence systems having the centralized topology and the distributed topology described in connection with FIGS. 2 to 4.

FIG. 7 is a signal flow diagram a method of selecting a master CM (coexistence manager) in the coexistence system having the centralized topology according to the exemplary embodiment according to the present disclosure.

As shown in FIG. 7, according to the method of selecting the master CM 40 in the centralized topology, the CDIS 11 receives TV channel lists from the TVBD 100 in operation S55, the CDIS 11 calculates neighbor and C-MAP of the CMs and selects the master CM 40 of the CMs in operation S56 and S57, and the CDIS 11 informs the other CMs (for example, the CM 20 and the CM 22) of this in operation S58 to S60.

A process in which the master CM 40 is selected in the centralized topology will now be described in detail.

When the AP 50 is registered to the TVBD 100 and the CM 20 in operation S51 to S53, the CM 20 is registered to the CDIS 11 in operation S54. The CDIS 11 obtains available TV channel lists from the TVBD 100 in operation S55. Here, the TVBD 100 updates available TV channel lists at regular intervals. The CDIS 11 calculates neighbor or neighbor set and C-MAP of the CMs (for example, the CM 20 and the CM 22) in operation S56, selects the master CM 40 in operation S57, and informs the respective CMs of this in operations S58 to S60. The finally selected master CM 40 becomes a master of the AP in operation S61.

FIG. 8 is a signal flow diagram illustrating a method of selecting a master CM (coexistence manager) in the coexistence system having the distributed topology according to the exemplary embodiment according to the present disclosure.

As shown in FIG. 8, according to the method of selecting the master CM 40 in the distributed topology, the CDIS 11 receives channel lists from the TVBD 100 in operation S75, the CDIS 11 calculates neighbor and C-MAP of the CMs and informs the respective CMs of the neighbor and the C-MAP in operation S76 to S79, and the respective CMs negotiate with each other in order to select the master CM 40 or the master device in operations S80 to S82.

A process of selecting the master CM 40 in the distributed topology will now be described in detail with reference to FIG. 8.

When the AP 50 is registered to the TVBD 100 and the CM 20 in operations S71 to S73, the CM 20 is registered to the CDIS 11 in operation S74. The CDIS 11 obtains information about available TV channel lists from the TVBD 100 in operation S75. Here, the TVBD 100 updates available TV channel lists at regular intervals. The CDIS 11 calculates neighbor or neighbor set and C-MAP of the CMs in operation S76, and informs the respective CMs of neighbor lists of the CMs in operations S77 to S79. The respective CMs negotiate with each other for resources and select the master CM in operations S80 TO S82, and the selected master CM 40 becomes a master of the AP in operation S83. The selected master CM 40 informs the respective CMs of this in operations S84 and S85.

Figure 9:
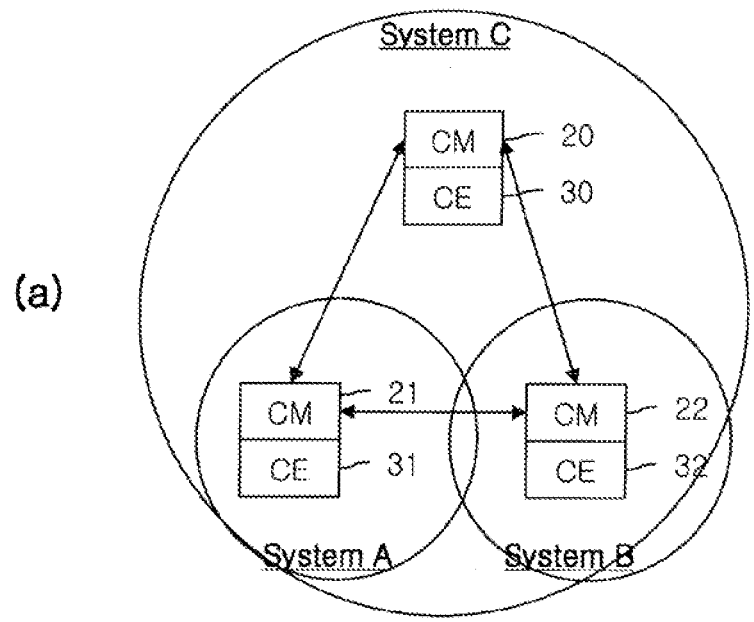
FIGS. 9A and 9B are exemplary views showing that various architectures can be supported between different types of CMs (coexistence managers) through enable/disable in the coexistence system according to the exemplary embodiment according to the present disclosure.
Figure 9:
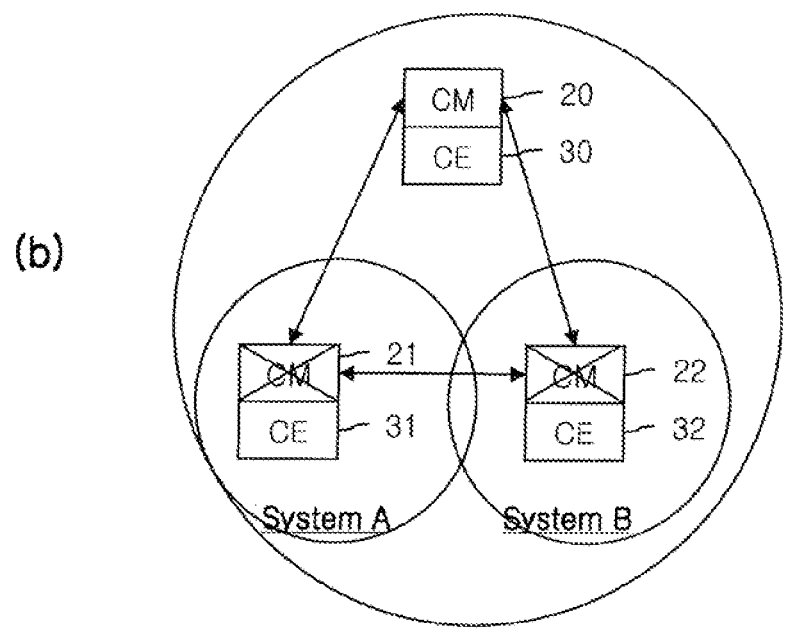
Figure 10:
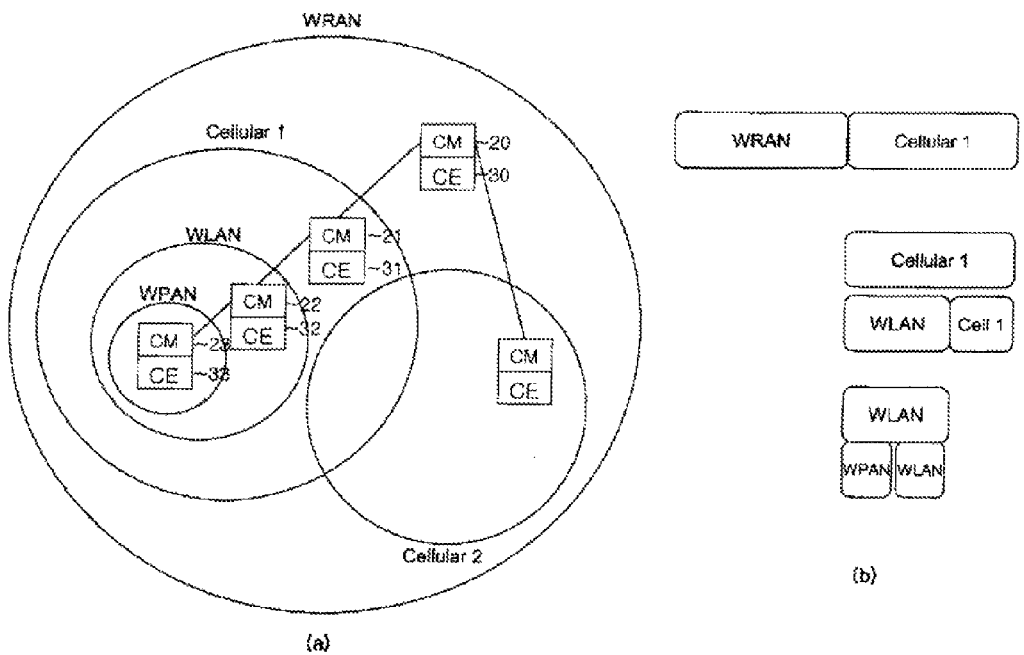
FIGS. 10A and 10B are exemplary views illustrating an example in which a hierarchical architecture is created through enable/disable between different types of CMs (coexistence managers) in the coexistence system according to the exemplary embodiment according to the present disclosure.

FIGS. 9 and 10 show that a master CM or a master device (BS, eNodeB, or MS) is selected in the same type of systems or networks that can coexist without cooperation, and networks or devices (or CM/CE of devices), instead of the master CM or the master device, are controlled, turned ON/OFF or disabled, thereby adaptively supporting various types of architectures.

FIGS. 9A and 9B are exemplary views showing that various types of architectures can be adaptively supported through enable/disable between different types of CMs (coexistence managers) in the coexistence system according to the exemplary embodiment according to the present disclosure.

As shown in FIGS. 9(a) and 9(b), CMs in different types of systems requiring cooperation may be embodied to adaptively support various types of architectures through ON/OFF, active/inactive, or enable/disable between the CMs. When CMs in different kinds of systems (for example, system A, system B, and system C) form a peer to peer architecture as shown in FIG. 9(a), a tree structure can be formed though enable/disable between the CMs such that the CM 20 that is enabled serves as a controller of the CM 21 and the CM 22 that are disabled as shown in FIG. 9(b)."

FIGS. 10(a) and 10(b) are exemplary views illustrating an example in which a hierarchical architecture is created through enable/disable between different types of CMs (coexistence managers) in the coexistence system according to the exemplary embodiment according to the present disclosure. As shown in FIG. 10(a), a master CM is selected by ON/OFF, active/inactive, or enable/disable between CMs, thereby creating vertical relations. Thus, each CM can implement decision making with respect to networks in its horizontal layer and lower layer.

For example, as shown in FIG. 10(b), a cellular system may determine a resource region of a WLAN, which is its lower layer, and its own resource region, while the WLAN may determine its own resource region and a resource region of a WPAN, which is its lower layer, with respect to resources allocated from the cellular system.

Figure 11:
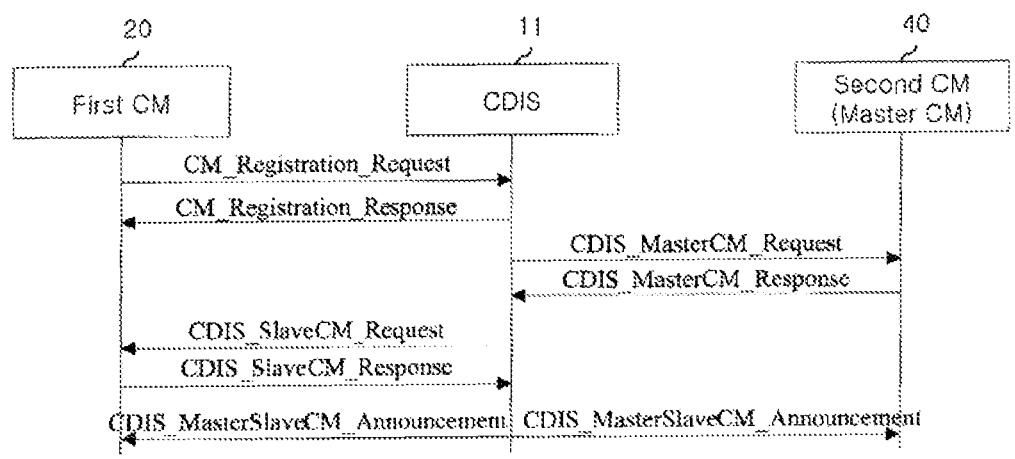
FIG. 11 is an exemplary view illustrating a process of selecting a master CM in the coexistence system according to the exemplary embodiment according to the present disclosure.

FIG. 11 is an exemplary view illustrating a process of selecting a master CM in the coexistence system according to the exemplary embodiment according to the present disclosure.

With reference to FIG. 11, when the first CM 20 performs registration to the CDIS 11 while the second CM 40 is registered to the CDIS 11, the CDIS 11 selects any one of the first CM 20 and the second CM 40 as a master CM (or representative CM), sends a request to the selected CM requesting to be a master CM and a request to another CM, which is not selected, to be a slave CM (or auxiliary CM), which will now be described in detail.

First, it is assumed that the second CM 40 is registered to the CDIS 11, and the CDIS 11 receives a registration request message from the first CM 20, for example, a CM_Registration_Request message.

The CM_Registration_Request message is used in order to inform the CDIS 11 of a TV BD serviced by the first CM 20 or information about devices. This CM_Registration_Request message may be sent to update and delete the information as well as to obtain initial registration. Also, this message may include information shown in Table 1 as follows.

TABLE 1

| Information element | Data type | Description |
|---|---|---|
| Header | | |
| sourceIdentifier = CM_ID | CX_ID | Source identifier |
| destinationIdentifier = CDIS_ID | CX_ID | Destination identifier |
| ACKPolicy | BOOLEAN | Requests recipient to send response |
| Payload | | |
| Notes: The following elements may overlap for each TVBD or device. | | |
| operationCode | OperationCode | Indicates whether this is a new registration or update or delete information. |
| networkID | NetworkID | E.g., BSS ID |
| networkTechnology | NetworkTechnology | E.g., 802.11af, 802.22 |
| networkType | NetworkType | E.g., fixed, mode 2 |
| discoveryInformation | DiscoveryInformation | |
| listOfSupportedCh-Number | ListOfSupportedCh-Number OPTIONAL | List of supported channel numbers |
| listOfSupported-Frequencies | ListOfSupported-Frequencies OPTIONAL | List of supported frequencies |

The CDIS 11 that has receives the registration request message sends a registration response message, for example, a CM_Registration_Response message to the first CM 20.

The CDIS 11 sends a request message requesting the elected (or selected) candidate to be a master CM, that is, a master CM request message, for example, a CDIS_MasterCM_Request message to the elected (or selected) candidate for the master CM, for example, the second CM 40, in FIG. 11. The above-described message may include information shown in Table 2 as follows.

The CDIS 11 sends a request message requesting the elected (or selected) candidate to be a master CM, that is, a master CM request message, for example, a CDIS_MasterCM_Request message to the elected (or selected) candidate for the master CM, for example, the second CM 40, in FIG. 11. The above-described message may include information shown in Table 1 as follows.

TABLE 2

| Information element | Data type | Description |
|---|---|---|
| Header | | |
| sourceIdentifier = CDIS_ID | CX_ID | Source identifier |
| destinationIdentifier = CM_ID | CX_ID | Destination identifier |
| ACKPolicy | BOOLEAN | Requests response from recipient |
| Payload | | |
| CMIdentifier | COEX_ID | CM identifier |

When receiving a master CM response message that includes a positive response to the master CM request message, for example, a CDIS_MasterCM_Response message from the second CM 40, the CDIS 11 raises the status of the second CM 40 from the candidate to the master CM.

The CDIS_MasterCM_Response message may include information as shown in Table 3 as follows.

TABLE 3

| Information element | Data type | Description |
|---|---|---|
| | Header | |
| sourceIdentifier = CM_ID | CX_ID | Source identifier |
| destinationIdentifier = CDIS_ID | CX_ID | Destination identifier |
| ACKPolicy | BOOLEAN | Requests response from recipient |
| | Payload | |
| status | BOOLEAN | Status: accepted or not |
| MasterCMIdentifier | COEX_ID | CM identifier |

The CDIS 11 elects (or selects) one of the CMs as a candidate for a slave CM, for example, the first CM 20 in FIG. 11 on the basis of various types of information.

The CDIS 11 then sends a request message requesting the first CM 20 to be a slave CM, that is, a slave CM request message, for example, a CDIS_SlaveCM_Request message as shown in FIG. 11 to the first CM 20. The CDIS_SlaveCM_Request message may be expressed as shown in Table 4 as follows.

TABLE 4

| Information element | Data type | Description |
|---|---|---|
| | Header | |
| sourceIdentifier = CDIS_ID | CX_ID | Source identifier |
| destinationIdentifier = CM_ID | CX_ID | Destination identifier |
| ACKPolicy | BOOLEAN | Request response from recipient |
| | Payload | |
| CMIdentifier | COEX_ID | CM identifier |

When the first CM 20 sends a slave CM response message that includes a positive response to the slave CM request message, for example, a CDIS_SlaveCM_Response message, the CDIS 11 sends a selection result announcement message, for example, a CDIS_MasterSlaveCM_Announcement message to the first and second CMs.

The CDIS_SlaveCM_Response message may be expressed as shown in Table 5 as follows.

TABLE 5

| Information element | Data type | Description |
|---|---|---|
| | Header | |
| sourceIdentifier = CM_ID | CX_ID | Source identifier |
| destinationIdentifier = CDIS_ID | CX_ID | Destination identifier |
| ACKPolicy | BOOLEAN | Requests response from recipient |
| | Payload | |
| status | BOOLEAN | Status: accepted or not |
| SlaveCMIdentifier | COEX_ID | CM identifier |

The CDIS_MasterSlaveCM_Announcement message may be expressed as shown in Table 6 as follows.

TABLE 6

| Information element | Data type | Description |
|---|---|---|
| | Header | |
| sourceIdentifier = CDIS_ID | CX_ID | Source identifier |
| destinationIdentifier = CM_ID | CX_ID | Destination identifier |
| ACKPolicy | BOOLEAN | Requests response from recipient |
| | Payload | |
| masterCMID | CX_ID | Identifier of master CM |
| SlaveCMIdentifier | COEX_ID | CM identifier |

On the other hand, when receiving a master CM response message that includes a negative response to the master CM request message, for example, a CDIS_MasterCM_Response message from the second CM 40, the CDIS 11 may eliminate the second CM 40 from the candidate and send a master CM request message to the next candidate, for example, the first CM 20.

Figure 12:
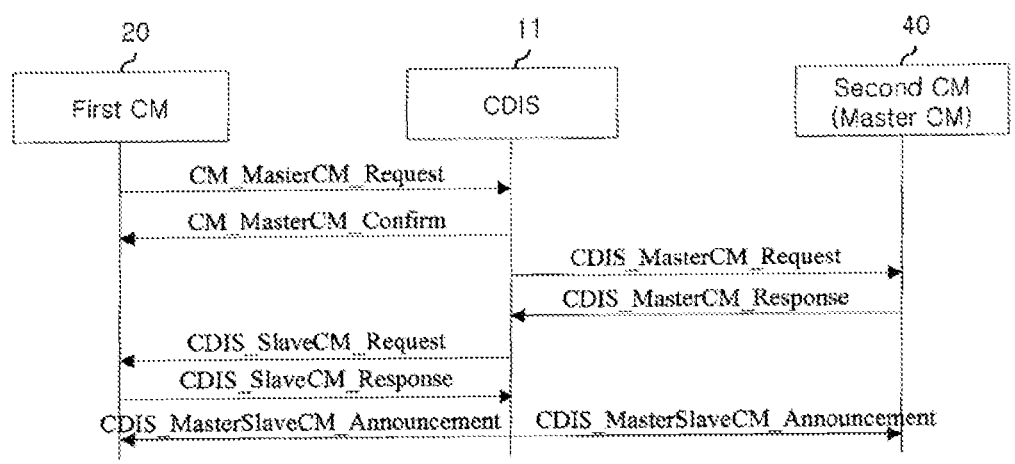
FIG. 12 is an exemplary view illustrating another process of selecting a master CM in the coexistence system according to the exemplary embodiment according to the present disclosure.

FIG. 12 is an exemplary view illustrating another process of selecting a master CM in the coexistence system according to the exemplary embodiment according to the present disclosure.

With reference to FIG. 12, while the first CM 20 and the second CM 40 are present, if the first CM 20 requests the CDIS 11 to select a master CM, the CDIS 11 selects a master CM and a slave CM, which will be described in more detail.

First, the first CM 20 sends a request message requesting the CDIS 11 to select a master CM, that is, a master CM selection request message, for example, a CM_MasterCM_Request message as shown in FIG. 12 to the CDIS 11.

The CM_MasterCM_Request message may be expressed as shown in Table 7 as follows.

TABLE 7

| Information element | Data type | Description |
|---|---|---|
| | Header | |
| sourceIdentifier = CM_ID | CX_ID | Source identifier |
| destinationIdentifier = CDIS_ID or CM_ID | CX_ID | Destination identifier |
| ACKPolicy | BOOLEAN | Requests response from recipient |
| | Payload | |
| CMIdentifier | COEX_ID | CM identifier |

Then, the CDIS 11 sends a master CM selection response message, for example, a CM_MasterCM_Confirm message, as shown in FIG. 12, as a response to the master CM selection request message to the first CM 20. The CM_MasterCM_Confirm message may be expressed as shown in Table 8 as follows.

TABLE 8

| Information element | Data type | Description |
|---|---|---|
| Header | | |
| sourceIdentifier = CDIS_ID | CX_ID | Source identifier |
| destinationIdentifier = CM_ID | CX_ID | Destination identifier |
| ACKPolicy | BOOLEAN | Requests response from recipient |
| Payload | | |
| None | | |

When receiving the master CM selection request message, the CDIS 11 determines whether two or more CMs, that is, the first CM 20 and the second CM 40 are present. If there are two or more CMs, the CDIS 11 elects (or selects) one of the CMs as a candidate for a master CM on the basis of various types of information.

The CDIS 11 sends a request message requesting the elected (or selected) candidate for the master CM to be a master CM, that is, a master CM request message, for example, a CDIS_MasterCM_Request message to the elected (or selected) candidate for the master CM, for example, the second CM 40 in FIG. 12. The message may include information as shown in Table 2 as described above.

When receiving a master CM response message that includes a positive response to the master CM request message, for example, a CDIS_MasterCM_Response message from the second CM 40, the CDIS 11 raises the status of the second CM 40 from the candidate to the master CM.

The CDIS 11 then elects (or selects) one of the CMs as a candidate for a slave CM, for example, the first CM 20 in FIG. 12 on the basis of various types of information.

The CDIS 11 sends a request message requesting the first CM 20 to be a slave CM, that is, a slave CM request message, for example, a CDIS_SlaveCM_Request message as shown in FIG. 12 to the first CM 20.

When the first CM 20 sends a slave CM response message that includes a positive response to the slave CM request message, for example, a CDIS_SlaveCM_Response message, the CDIS 11 sends a selection result announcement message, for example, a CDIS_MasterSlaveCM_Announcement message to the first and second CMs.

When receiving a master CM response message that includes a negative response to the master CM request message, for example, a CDIS_MasterCM_Response message from the second CM 40, the CDIS 11 may eliminate the second CM 40 from the candidate and send a master CM request message to the next candidate, for example, the first CM 20.

Figure 13:
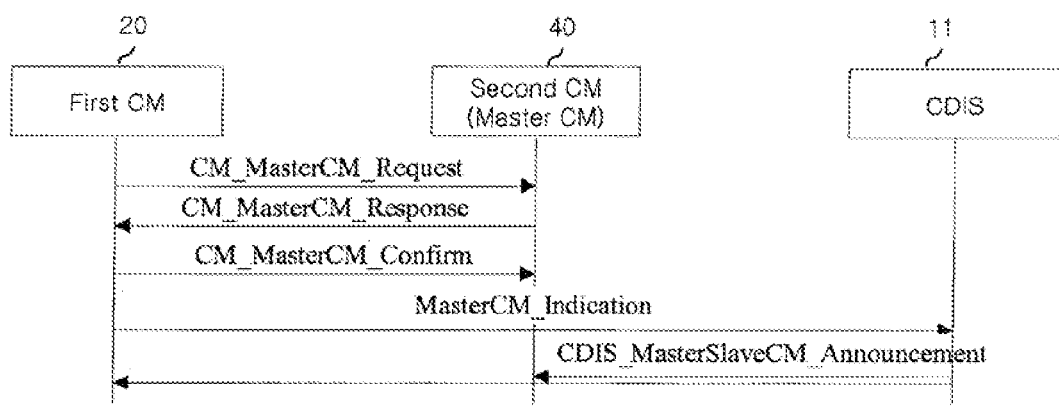
FIG. 13 is an exemplary view illustrating another process of selecting a master CM in the coexistence system according to the exemplary embodiment according to the present disclosure.

FIG. 13 is an exemplary view illustrating another process of selecting a master CM in the coexistence system according to the exemplary embodiment according to the present disclosure.

With reference to FIG. 13, while the first CM 20 and the second CM 40 are present, if the first CM 20 requests the second CM 40 to be a master CM, and the second CM 40 responds that the second CM 40 will become a master CM, the first CM 20 notifies the CDIS 11 of a master CM selection result, which will now be described in more detail.

First, the first CM 20 selects a candidate for a master CM among various different CMs. For example, in FIG. 13, the second CM 40 is selected as the candidate for the master CM.

Then, the first CM 20 sends a request message requesting the second CM 40 to be a master CM, that is, a master CM request message, for example, a CM_MasterCM_Request message to the second CM 40. The CM_MasterCM_Request message may be expressed as shown in Table 9 as follows.

TABLE 9

| | Data type | Description |
|---|---|---|
| Header | | |
| Name | | |
| SourceIdentifier | COEX_ID | Source identifier |
| DestinationIdentifier | COEX_ID | Destination identifier |
| InformationType | COEX_INFO_TYPE | Message type |
| DialogTocken | Integer | Message sequence number |
| Payload | | |
| Information element | | |
| TVBD type | TVBD_TYPE | TVBD device or network type |
| Geolocation | GEO_LOC | Registered geolocation |
| Channel number | Integer | Channel number |
| Maximum power level | Real | Power limit |
| Channel load (optional) | Real | Expected throughput |
| masterCMID | CX_ID | ID of master CM |
| SlaveCMIdentifier | COEX_ID | Identifier of slave CM |

When receiving the master CM request message, the second CM 40 determines whether to be a master CM on the basis of various types of information. When the second CM 40 determines to be a master CM, the second CM 40 sends a master CM response message that includes determined information, for example, a CM_MasterCM_Response message to the first CM 20.

Here, when the second CM 40 determines to be a master CM, the second CM 40 may select at least one slave CM from a plurality of CMs and include an identifier of the selected slave CM in the above-described message.

The CM_MasterCM_Response message may be expressed as shown in Table 10 as follows.

TABLE 10

| | Data type | Description |
|---|---|---|
| Header | | |
| Name | | |
| SourceIdentifier | COEX_ID | Source identifier |
| DestinationIdentifier | COEX_ID | Destination identifier |
| InformationType | COEX_INFO_TYPE | Message type |
| DialogTocken | Integer | Message sequence number |
| Payload | | |
| Information element | | |
| TVBD type | TVBD_TYPE | TVBD device or network type |
| Geolocation | GEO_LOC | Registered geolocation |
| Channel number | Integer | Channel number |
| Maximum power level | Real | Maximum power limit |
| Channel load (optional) | Real | Expected throughput |
| masterCMID | CX_ID | ID of master CM |
| SlaveCMIdentifier | COEX_ID | Identifier of slave CM |

When receiving the master CM response message, the first CM 20 checks information in the master CM response message and determines whether the second CM 40 has accepted to be the master CM or not. When the second CM 40 has rejected being a master CM, the first CM 20 determines whether to become a master CM. When the second CM 40 has not accepted to be a master CM, and the first CM 20 does not become a master CM, the first CM 20 sends a master CM request message to another device.

When the second CM 40 has accepted to be a master CM, the first CM 20 may determine whether the first CM 20 itself needs to be a slave CM or another CM needs to be a slave CM.

The first CM 20 sends a confirmation message, for example, a CM_MasterCM_Confirm message as shown in FIG. 13 to the second CM 40.

The first CM 20 then sends a master CM selection result indication message, for example, a MasterCM_Indication message to the CDIS 11.

The MasterCM_Indication message may be expressed as shown in Table 11 as follows.

TABLE 11

| Information element | Data type | Description |
|---|---|---|
| | Header | |
| sourceIdentifier = CM_ID | CX_ID | Source identifier |
| destinationIdentifier = CDIS_ID | CX_ID | Destination identifier |
| ACKPolicy | BOOLEAN | Requests response from recipient |
| | Payload | |
| slaveCMID | CX_ID | ID of slave CM |
| masterCMID | CX_ID | ID of master CM |

When the CDIS 11 receives the indication message, the CDIS 11 sends a master and slave CM selection result announcement message, for example, a CDIS_MasterSlaveCM_Announcement message to other CMs as well as the first CM 20 and the second CM 40.

Figure 14:
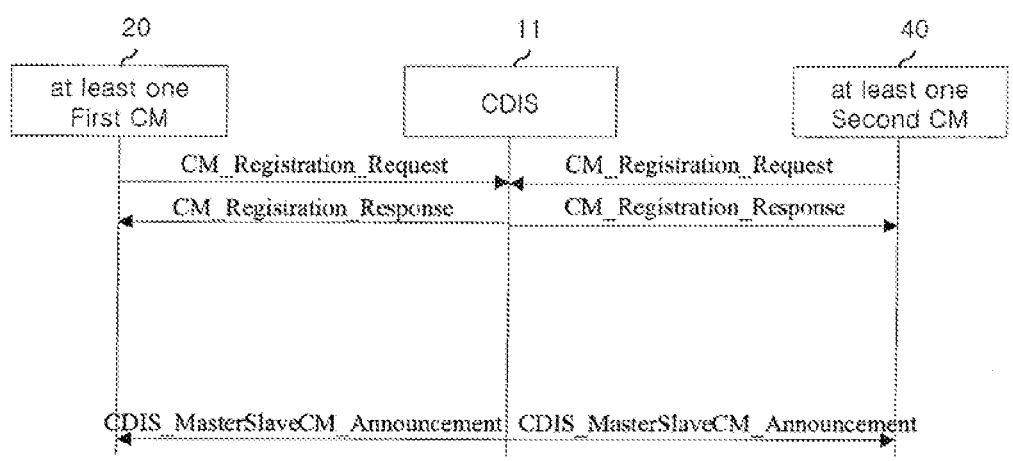
FIG. 14 is an exemplary view illustrating another process of selecting a master CM in the coexistence system according to the exemplary embodiment according to the present disclosure.

FIG. 14 is an exemplary view illustrating another process of electing a master CM in the coexistence system according to the exemplary embodiment according to the present disclosure.

With reference to FIG. 14, when at least one first CM 20 and at least one second CM 40 each send a registration request message, for example, a CM_Registration_Request message so as to be registered to the CDIS 11, the CDIS 11 sends a registration response message, for example, a CM_Registration_Response message to the at least one first CM 20 and the at least one second CM 40. The CDIS 11 selects an appropriate master CM and an appropriate slave CM among the first CM and the second CM. The CDIS 11 sends a selection result announcement message that includes a selection result, for example, a CDIS_MasterSlaveCM_Announcement message to the first and second CMs.

The description in connection with FIG. 14 can be easily understood by a person skilled in the art on the basis of the descriptions in connection with FIGS. 11 to 13. Thus, a more detailed description in connection with FIG. 14 will be omitted.

Figure 15:
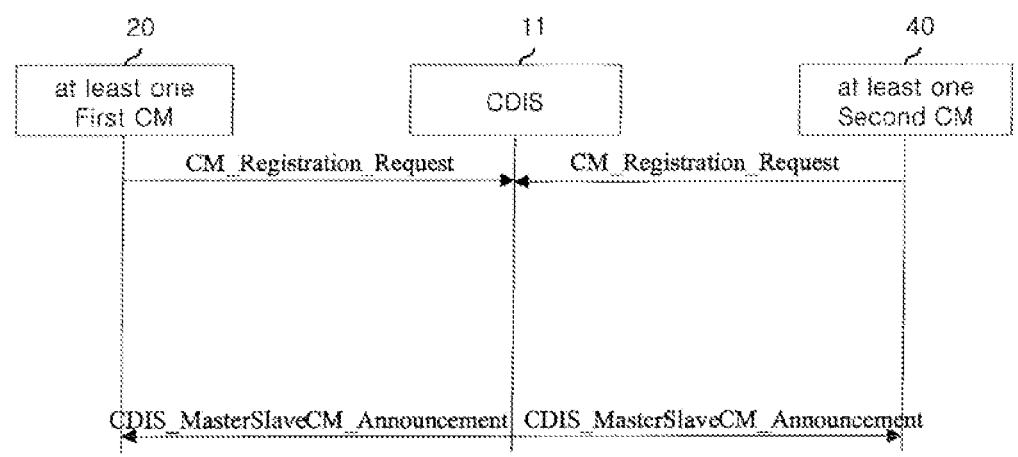
FIG. 15 is an exemplary view illustrating another process of selecting a master CM in the coexistence system according to the exemplary embodiment according to the present disclosure.

FIG. 15 is an exemplary view illustrating another process of electing a master CM in the coexistence system according to the exemplary embodiment according to the present disclosure.

With reference to FIG. 15, when at least one first CM 20 and at least one second CM 40 each send a registration request message, for example, a CM_Registration_Request message so as to be registered to the CDIS 11, the CDIS 11 selects an appropriate master CM and an appropriate slave CM among the first CMs and the second CMs. The CDIS 11 sends a selection result announcement message that includes a selection result, for example, a CDIS_MasterSlaveCM_Announcement message to the first and second CMs.

The description in connection with FIG. 15 can be easily understood by a person skilled in the art on the basis of the descriptions in connection with FIGS. 11 to 14. Thus, a more detailed description in connection with FIG. 15 will be omitted.

As set forth above, the process of selecting a master CM according to exemplary embodiments of the present invention is described.

Hereinafter, the configuration and function of a terminal and a server according to the present invention will be described.

A terminal according to the present invention may also be referred to as a device and includes any kind of terminal that can implement the exemplary embodiments of FIGS. 2 to 13. A terminal according to the present invention, that is, a device has a comprehensive meaning covering mobile communications terminals (for example, user devices (UE), mobile phones, cellular phones, DMB phones, DVB-H phones, PDA phones, and PTT phones) that can be practiced without departing from the spirit of the present invention, digital TVs, GPS navigations, portable game devices, MP3s and other home appliances. Also, a terminal according to the present invention has a comprehensive meaning covering a CM and a CE.

A server according to the present invention has a comprehensive meaning covering a CDIS and a DB.

Hereinafter, the configuration and function of a terminal and a server according to the present invention will be described.

A terminal and a server according to the present invention include software that implements the exemplary embodiments of FIGS. 2 to 10 or a module having the software mounted therein. This module is one component of a terminal or a server and may be called a processor or a controller. A terminal and a server according to the present invention include hardware and software components necessary to implement the above-described technical features of the present invention.

A terminal and a server according to the present invention each may include a storage unit, a transmission/reception unit, and a processor.

The method according to the present invention as set forth above may be implemented in software, hardware, or some combination thereof. For example, the method according to the present invention may be stored in the storage unit of the terminal or server (for example, an internal memory of a mobile terminal, a flash memory, a hard disk, or the like), and be carried out by the processor of the terminal or the server.

Hereinafter, a device and a method according to at least one embodiment according to the present disclosure have been described with reference to the accompanying drawings. The invention may, however, be embodied in many different forms and should not be construed as being limited to the embodiments and drawings set forth herein. Various changes and modifications within the spirit and scope of the invention will become apparent to those skilled in the art from the detailed description.

The above-described method of selecting a master device in the coexistence system is not limited to the configuration and method according to the above-described exemplary embodiments, but the entirety or part of the exemplary embodiments may be selectively combined to make various modifications.

As set forth, the exemplary embodiments according to the present disclosure have been described with the accompanying drawings.

Here, the terms or words used in the present disclosure or the claims should not be construed as being limited to general meanings or dictionary definitions but should be construed as coinciding with the spirit and scope of the present disclosure.

Therefore, since the foregoing embodiments according to the present disclosure and the configurations shown in the drawings are merely exemplary and do not represent all the spirit or scope of the present disclosure, it is intended that the present invention cover modifications and variations of this invention provided they come within the scope of the appended claims and their equivalents at the time of the present application.

The invention claimed is:

1. A method for selecting a master coexistence manager (CM), the method performed by a server and comprising:
   receiving, from a first CM, a master selection request for requesting the server to take steps to cause the master CM to be selected;
   based on the master selection request:
   transmitting, to the first CM, a first confirmation message indicating that the server will take steps to cause the master CM to be selected;
   determining whether a plurality of CMs exist,
   wherein the plurality of CMs are configured to solve coexistence problems among a plurality of devices using channels in television bands; and
   when the plurality of CMs are determined to exist:
   selecting a first candidate master CM among the plurality of CMs;
   transmitting a master CM request to the first candidate CM;
   receiving a second confirmation message from the first candidate CM,
   wherein the second confirmation message is positive response indicating that the master CM request has been accepted by the first candidate CM;
   transmitting, to a second candidate CM selected among the plurality of CMs except for the master CM, a slave CM request message for selecting a slave CM;
   receiving a third confirmation message from the second candidate CM indicating that the slave CM request has been accepted by the second candidate CM; and
   transmitting, to the first candidate CM, a message indicating that the first candidate CM has been selected as the master CM and the second candidate CM has been selected as the slave CM.

2. The method of claim 1, further comprising:
   selecting a next candidate CM if the first confirmation message is a negative response indicating that the master CM request has not been accepted by the first candidate CM.

3. The method of claim 2, further comprising:
   transmitting the master CM request to the selected next candidate master CM if the first confirmation message is the negative response.

4. The method of claim 1, further comprising:
   receiving a registration request message from the plurality of CMs,
   wherein the registration request message is for registering at least one device using a television band.

5. The method of claim 1, wherein the server comprises a server for coexistence discovery and information, and performs at least calculating neighbor devices or selecting the master CM.

6. The method of claim 1, wherein the master CM performs at least one of:
   generating a coexistence white space map;
   making a decision for coexistence for the plurality of devices; or
   exchanging information required for coexistence.

7. The method of claim 1, wherein the plurality of devices use different types of network technologies.

8. The method of claim 1, wherein the plurality of CMs are included in a neighbor list.

9. The method of claim 1, wherein the server provides at least one of:
   information based on a location of a device;
   information on transmit power limit; or
   information on interference.

10. A method for selecting a master coexistence manager (CM) when a plurality of CMs has been determined to exist, the method comprising:
    transmitting, by a first CM to a second CM among the plurality of CMs, a first master selection request for requesting the second CM to take steps to cause the master CM to be selected; based on the master selection request,
    wherein the plurality of CMs are configured to solve coexistence problems among a plurality of devices using channels in television bands;
    receiving, by the first CM in response to the first master selection request, a first confirmation message indicating that the second CM will take steps to cause the master CM to be selected; and
    when the plurality of CMs are determined to exist:
    selecting a first candidate master CM among the plurality of CMs;
    transmitting, by the second CM, a master CM request to the first candidate CM;
    receiving, by the second CM, a second confirmation message from the first candidate CM,
    wherein the second confirmation message is positive response indicating that the master CM request has been accepted by the first candidate CM;
    transmitting, by the second CM, to a second candidate CM selected among the plurality of CMs except for the master CM, a slave CM request message for selecting a slave CM;
    receiving, by the second CM, a third confirmation message from the second candidate CM indicating that the slave CM request has been accepted by the second candidate CM; and
    transmitting, by the second CM, to the first candidate CM, a message indicating that the first candidate CM has been selected as the master CM and the second candidate CM has been selected as the slave CM.

11. The method of claim 10, wherein the master CM performs at least one of:
    generating a coexistence white space map;
    making a decision for coexistence for the plurality of devices; or
    exchanging information required for coexistence.

12. A device configured to select a master coexistence manager (CM) and comprising:
    a transmitting and receiving device; and
    a processor operatively connected to the transmitting and receiving device, the processor configured to:
    receive, from a first CM, a master selection request for requesting the server take steps to cause the master CM to be selected;

based on the master selection request:
- transmit, to the first CM, a first confirmation message indicating that the server will take steps to cause the master CM to be selected;
- determine whether a plurality of CMs exist,
- wherein the plurality of CMs are configured to solve coexistence problems among a plurality of devices using channels in television bands; and
- when the plurality of CMs are determined to exist:
  - select a first candidate master CM among the plurality of CMs;
  - transmit a master CM request to the first candidate CM;
  - receive a second confirmation message from the first candidate CM,
  - wherein the second confirmation message is positive response indicating that the master CM request has been accepted by the first candidate CM;
  - transmit, to a second candidate CM selected among the plurality of CMs except for the master CM, a slave CM request message for selecting a slave CM;
  - receive a third confirmation message from the second candidate CM indicating that the slave CM request has been accepted by the second candidate CM; and
  - transmit, to the first candidate CM, a message indicating that the first candidate CM has been selected as the master CM and the second candidate CM has been selected as the slave CM.

* * * * *